(12) United States Patent
Bessettes et al.

(10) Patent No.: US 10,752,331 B2
(45) Date of Patent: Aug. 25, 2020

(54) AIRCRAFT EMERGENCY EXIT DOOR WITH INTEGRATED MECHANISMS AND METHOD FOR OPENING/CLOSING SUCH A DOOR

(71) Applicant: LATECOERE, Toulouse (FR)

(72) Inventors: Cyrille Bessettes, Buzet sur Tarn (FR); Damien Buchet, Toulouse (FR)

(73) Assignee: Latecoere, Toulouse (FR)

( * ) Notice: Subject to any disclaimer, the term of this patent is extended or adjusted under 35 U.S.C. 154(b) by 296 days.

(21) Appl. No.: 15/773,221

(22) PCT Filed: Nov. 2, 2016

(86) PCT No.: PCT/EP2016/076324
§ 371 (c)(1),
(2) Date: May 3, 2018

(87) PCT Pub. No.: WO2017/076848
PCT Pub. Date: May 11, 2017

(65) Prior Publication Data
US 2018/0319479 A1    Nov. 8, 2018

(30) Foreign Application Priority Data

Nov. 3, 2015 (FR) ...................................... 15 60538
Feb. 19, 2016 (FR) ...................................... 16 00293

(51) Int. Cl.
*B64C 1/14* (2006.01)
*E05C 3/16* (2006.01)
*E05C 17/00* (2006.01)

(52) U.S. Cl.
CPC .............. *B64C 1/143* (2013.01); *E05C 3/162* (2013.01); *E05C 17/025* (2013.01); *E05Y 2900/502* (2013.01); *E05Y 2900/531* (2013.01)

(58) Field of Classification Search
CPC ...... B64C 1/143; B64C 1/1423; B64C 1/1407
See application file for complete search history.

(56) References Cited

U.S. PATENT DOCUMENTS 5,031,863 A * 7/1991 Noble .................... B64C 1/1407
244/129.5
5,305,969 A * 4/1994 Odell .................... B64C 1/1407
244/129.5

(Continued)

FOREIGN PATENT DOCUMENTS

EP         0876954        11/1998
WO    WO2013128219        9/2013

*Primary Examiner* — Richard G Davis
(74) *Attorney, Agent, or Firm* — Defillo & Associates, Inc; Evelyn A Defillo

(57) ABSTRACT

An aircraft emergency exit door (10) with opening mechanisms integrated by a grouping of the mechanisms into a door beam (3) located on a given side of a window (16) of standard dimensions. In the beam, an inner handle (1) is mounted on a main shaft (102) connected with a locking shaft (8A) on which there is mounted, against return springs (83), a door blocking/locking mechanism (8) comprising a lock (81). A mechanism for conditionally opening the door (100) includes a vent flap (110), a pivot connection (12) for coupling the flap (110) to the inner handle (1), and a blocking shaft (120) that has, at each end, a pressure lever (121) equipped with supports for blocking (122) and unblocking (123) the flap (110). Return springs (32) mounted against the conditional opening mechanism (100) are calibrated to allow the opening of the flap (110) by exerting reduced pressure in residual pressure variation conditions, and to prevent it from opening in overpressure conditions.

13 Claims, 13 Drawing Sheets

(56) References Cited

U.S. PATENT DOCUMENTS

| | | | | |
|---|---|---|---|---|
| 5,337,977 A | * | 8/1994 | Fleming | B64C 1/1407 |
| | | | | 244/129.5 |
| 5,931,415 A | * | 8/1999 | Lingard | B64C 1/143 |
| | | | | 244/129.4 |
| 2011/0049299 A1 | * | 3/2011 | Gowing | B64C 1/143 |
| | | | | 244/129.5 |

* cited by examiner

AIRCRAFT EMERGENCY EXIT DOOR WITH INTEGRATED MECHANISMS AND METHOD FOR OPENING/CLOSING SUCH A DOOR

CROSS REFERENCE TO RELATED APPLICATION

This application is a national stage entry of PCT/EP2016/076324 filed Nov. 2, 2016, under the International Convention claiming priority over French Patent Application No. 1560538 filed Nov. 3, 2015 and French Patent Application No. 1600293 filed Feb. 19, 2016.

TECHNICAL FIELD

The invention relates to an aircraft emergency exit door with integrated opening mechanisms, i.e. which are concentrated in a reduced space of the door, as well as to a method for opening/closing an emergency exit door of this type.

An emergency exit door of an aircraft is generally situated above the wing unit of the aircraft known as the "overwing emergency exit door". In general, an aircraft is equipped with one or two emergency exit doors over the wing, which are situated on both sides of the fuselage. The evacuation of the passengers in an emergency situation is the essential function of this door.

BACKGROUND OF THE INVENTION

In general, the kinematics of opening of an aircraft door, for example a passenger door or a emergency door, is broken down into several steps which succeed one another, i.e. unlocking after releasing the lock by means of a safety latch, then disengagement of the door from its frame towards the inside of the cabin by appropriate guiding, and then pivoting of the door by actuators in association with a hinge around an axis of rotation. For the closure, these movements succeed one another according to inverse kinematics.

In emergency situations, it is required to be able to trigger the opening of the door in a minimum of operations in a minimum amount of time, whilst making the opening secure.

The regulations now require emergency doors to be able to be moved away without obstructing the emergency exits. In order to comply with this, emergency exit doors over the wing have been designed reusing the architectures of doors of the passenger type or cabin service type, and applying a reduction of scale. The stores of the passenger cabin type, which are pressurized in the cabin and provided with hinges, open automatically after activation of the inner handle and an articulation arm, with the door then being kept open along the fuselage.

According to the regulations, these overwing doors of the passenger type are certified as "dangerous", because of their complexity, whereas the prior overwing doors (doors without a hinge known as a hatch can be thrown onto the wing as soon as the emergency opening takes place) were considered to be "non-dangerous" because their surface areas, larger than that of the passage hole in the fuselage, give rise to a very low probability of opening in flight. All the functions of the passenger and service doors must therefore be integrated in the emergency doors over wings, and therefore in a greatly reduced surface area, all the more so since the presence of a large window, identical to the windows of the fuselage, is now also required in the emergency doors.

In addition to all the functions of a so-called "dangerous" door to be integrated—double safety by means of a latch/lock during the locking/unlocking phases, secure opening/closure mechanisms, visual indicators and proximity sensors, assistance with the emergency opening and pressurization blocking mechanism if the door is not correctly closed—another parameter must be taken into account, i.e. the proximity of certain passengers to this overwing door, these passengers then being subjected to the thermal and acoustic problems which are associated with the presence of doors of this type. Consequently it is important to keep the maximum amount of space in the door structure in order to be able to install acoustic patches or thermal covers there.

An aircraft emergency door supported on lateral stops is known for example from the document of U.S. Pat. No. 5,031,863, which stops are in motion on rollers in guides, and are made secure by two latches situated in the threshold of the door.

The general kinematics of the door consist of a movement towards the inside then a movement of lifting of the top of the door in order to bypass the stops. The bottom of the door is guided in ramps, then the door opens automatically upwards, thrust by connecting rods with compression springs. The door is articulated by a hinge consisting of two arms in the form of a swan necks in the top part. The lifting of the door is generated by a cam connected to the top part of the handle. An inner handle is arranged above the window, and is actuated in a movement from the top downwards.

This door does not carry out all the functions of a door of the type which is "dangerous" according to the regulations, i.e. the double safety of the locking/unlocking phases and the pressurization blocking are not provided. In addition, this door can only be closed from the inside, and the locking mechanism is reduced to a hook at the bottom of the door.

Patent document U.S. Pat. No. 5,931,415 relates to a door of the automatic opening type, and proposes opening kinematics towards the inside coupled with descent in order to bypass the stops. The guiding is carried out by supports in ramps in order to impart the opening kinematics to the top of the door, whereas the bottom of the door follows a movement downwards then outwards. The door is retained in the open position thanks to a latch which automatically engages when opening takes place. In addition, the outer handle is connected to the shaft of the latch, whereas the inner handle is articulated relative to this assembly.

In addition, this door does not comprise a system which prevents pressurization if the door is not completely closed ("non-dangerous" door criterion according to the regulations). The ventilation panel of this mechanism is used as a pressure lock, in order to prevent the door from opening in the case of flight with low pressurization. In addition, this door does not have a safety system if one of the locks were to break. Finally, the kinematics of this door are complex, and the safety functions are not fulfilled.

In addition, the door according to patent document WO 2013128219 is articulated at the top by means of an arm and a set of rocker bars which are raised by a gas actuator. The virtual hinge articulation point is on the outside of the fuselage. The door opens after a low-amplitude movement towards the inside then upwards in order to bypass the stops.

The inside handle has a horizontal axis, is situated above the window, and operates from the top downwards. It makes it possible to open in emergency mode (toboggan armed) and in maintenance mode (toboggan disarmed). In addition to the particular kinematics with an instantaneous center of rotation situated on the outside of the door, this assembly does not fulfil the safety conditions in terms of double safety in locking and unlocking, and of a pressurization blocking mechanism (since the classification of this door is "non-dangerous" according to the regulations).

SUMMARY OF THE INVENTION

The objective of the invention is to comply with the main conditions which doors which are known as "dangerous" according to the regulations must fulfil, i.e. double safety in locking and unlocking, as well as secure opening/closure mechanisms, assistance with emergency opening, and a pressurization blocking mechanism in the event of incorrect closure of the door. The objective of the present invention is also to provide functional mechanisms which are grouped so as to permit a combination of these functions in a reduced space—i.e. on an emergency door provided with a window of a standard size—and to facilitate the opening/closure kinematics of the door.

For this purpose, the invention concentrates the mechanisms of opening of a vent flap of a first overwing door opening movement, of blocking/locking of this door, of a second opening movement of the door, then its rotation solely by manipulation of the inner handle, whilst developing kinematics suitable for the concentration of mechanisms thus integrated.

For this purpose, the subject of the present invention is an aircraft emergency exit door with opening mechanisms which are integrated by grouping.

This grouping of door opening mechanisms is carried out in a grouping strip situated on a side of a window with standard dimensions, i.e. which is similar to the other windows of this aircraft. In a strip of this type, the grouping comprises a door opening inner handle fitted on a main shaft in association with a locking shaft on which there is fitted a mechanism for blocking/locking the door with a latch and lock. At least one mechanism for conditional opening of the door comprises a vent flap arranged in the door, a pivot connection arranged in the door in order to couple the vent flap to the inner handle, and a blocking shaft which has at each end a pressure lever equipped with a first and second support for blocking and unblocking of the flap. Return springs which are fitted against the conditional opening mechanism are calibrated in order to allow opening of said flap by exerting a reduced pressure in pressure variation conditions, i.e. in standard conditions with variation of residual pressure between the inside and outside of the aircraft which is close to zero (for example lower than 1 psi), and in order to prevent the flap from opening in excess pressure conditions.

In standard conditions, the variation between said inner and outer pressures of the aircraft is residual, typically lower than 1 psi, and the conditions of excess pressure or pressurization exist in particular when the aircraft reaches a certain altitude, typically with a pressure variation higher than 2 psi.

According to a preferred embodiment, the first and second blocking and unblocking supports can come into contact respectively on a stop and on a cam which are secured respectively on the blocking shaft and on a door mounting. In residual pressure variation conditions, the pressure levers and the flap can be displaced jointly by actuation of the inner handle, and can allow the flap to open. In excess pressure conditions, the flap remains on the door, and the first supports then come into contact with the stops in order to block the flap.

In excess pressure conditions, the flap remains on the door. The blocking shaft can then turn when the inner handle is raised, and, with the second supports rolling below each cam, the first supports come into contact with the stops in order to block the flap.

The mechanism with pressure levers allows the system to prevent the opening of the flap and the door, which makes the flight secure. Thus, when an excess pressure persists (starting from a certain altitude of the aircraft), the passengers cannot open the emergency exit door.

According to advantageous characteristics:

an exit opening button is provided on an outer face of the vent flap, in order to actuate an opening cam, disengage the pressure levers and thus permit opening of the door from the outside of the aircraft;

the supports are rollers;

in principle the springs are calibrated to substantially 1 psi, but their rigidity can be adapted according to the strategies of the airframe manufacturers.

According to an advantageous embodiment, the blocking/locking mechanism comprises a blocking latch for each lock. Each lock is fitted directly against a hinge for pivoting and retention of the door in the open position, with fitting of this type making it possible to block any displacement of the door at relative azimuth of the aircraft.

This fitting makes it possible to avoid the conventional positioning of the locks on the edges of the door with a counter-mounting of each lock on the door framework.

Advantageously, the locking/unlocking mechanism (for a door which is "dangerous" according to the regulations) is formed by a latch and counter-latch blocking assembly combined with each lock. In each assembly, the counter-latch and the lock, which are fitted on the same locking shaft, form a single part. More particularly:

the latch is configured to envelop the lock and retain it in place when the locking mechanism breaks, in order to keep the door in a secure state;

the counter-latch is configured to form a protuberance inside the latch, which makes it possible to create a stop when breakage of the locking mechanism takes place.

According to another advantageous embodiment, a ice breakage mechanism is also integrated in the mechanism grouping strip. This ice breakage mechanism comprises at each end of the strip a breakage cam which is fitted on the main shaft. Each cam is guided by a pivoting ramp connected to a return spring, in order, by means of the actuation of the locking shaft by the inner handle, to generate a door opening sequence with a minimal amplitude towards the inside of the passenger cabin, and to break a specific thickness of ice, for example a standard thickness of 2.5 mm, on an outer skin of the door. This first displacement of the door is designed to detach/break the ice in the case when a layer of ice or frost is covering the fuselage.

In these conditions, this ice breakage mechanism is independent from the locking/unlocking mechanisms of the latch and lock assemblies, since it is initiated directly by actuating the main shaft from the inner handle.

Preferably, the door opening mechanism grouping strip extends horizontally above the window, with the door being able to open by pivoting according to a horizontal axis which coincides substantially with an upper edge of the emergency door. The flap is positioned at the strip, and/or is offset below the window, connected to coupling connecting rods which connect the main shaft and the shaft for blocking of the flap.

The invention also relates to a method for opening/closure of an aircraft emergency exit door of this type which is situated over the aircraft wing, in order to permit evacuation of the passenger cabin, with the closure kinematics of the door repeating the above opening steps in inverse order. The method consists of implementing opening kinematics for a door which is arranged in the framework of the aircraft fuselage, starting from an initial state in which the door is in the closed position with its profile aligned with the fuselage, according to the following series of steps generated in succession by a single action exerted on an inner handle in a pivoting sequence around a main shaft:

a first step of opening of a vent flap of the conditional opening mechanism, when a pressure variation between the cabin and the outside of the aircraft is lower than a specific residual value;

a step of unblocking/unlocking by actuation of a movement of the latches in order to unblock the locks and retract these unblocked locks so as to finalize the unlocking by releasing the main shaft;

a step of opening of the door by rotation of the main shaft, giving rise to a movement of tilting of the door towards the inside of the cabin;

a step of translation substantially parallel to the fuselage, in association with guiding in the door framework and bypassing of the fuselage stops; and a step of pivoting of the door entrained around an axis of rotation of hinges, and assisted in this rotation by actuators which are arranged laterally.

Preferably, the step of translation of the door is a step of descent facilitated by its own weight.

According to preferred functional characteristics:

a condition of excess pressure between the inside and the outside of the aircraft, higher than a given threshold value, blocks the conditional opening mechanism during its implementation, in order to prevent the opening of the vent flap during the first step;

a preliminary step of opening of the door towards the inside of the cabin with minimal amplitude is generated by initiation of rotation of cams which are fitted on the main shaft, in association with a lever and a return spring, this step being carried out after the step of unblocking/unlocking;

the initiation of preliminary rotation, which is designed to break the ice, is carried out by a to-and-fro rotation/counter-rotation according to an appropriate configuration of the cams.

BRIEF DESCRIPTION OF THE FIGURES

Other data, characteristics and advantages of the present invention will become apparent from reading the following which describes embodiments of the invention provided purely by way of non-limiting example. These detailed embodiments are accompanied by figures for better visualization and understanding of the combination of means implemented, with these figures representing respectively.

DETAILED DESCRIPTION

In the present text, the location terms "upper", "lower", "above" and "below" relate to standard location configurations of elements of an aircraft on the ground or in cruising flight. The term "lateral" relates to a plane perpendicular to the fuselage of an aircraft.

Figure 1:
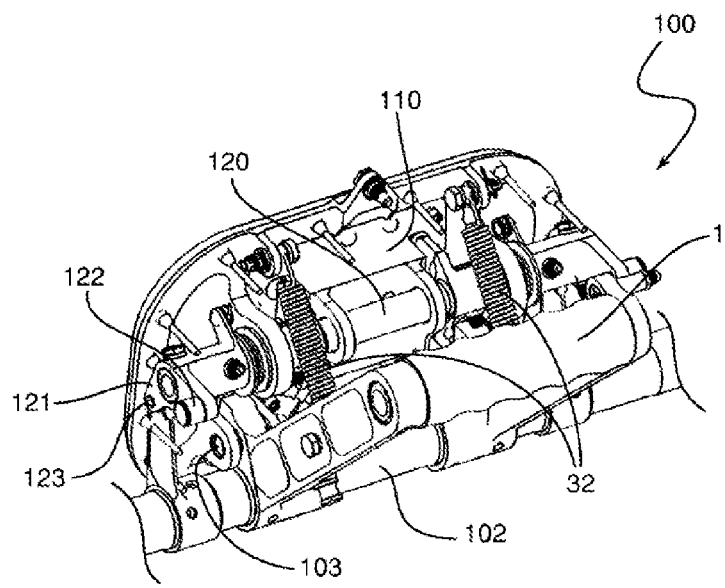
FIG. 1 SHOWS a lateral view in perspective of the conditional opening mechanism.
Figure 2:
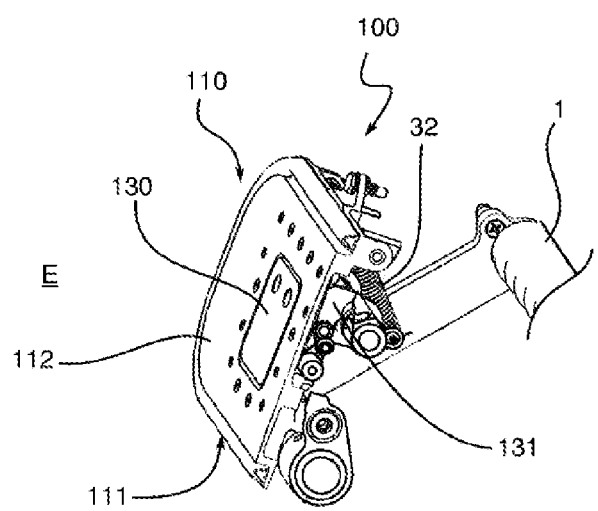
FIG. 2 shows lateral view in perspective of the conditional opening mechanism including a cut-out of the door flap for better visibility in the lateral view.

The conditional opening mechanism 100 with a vent flap 110, as illustrated in the views in perspective in FIG. 1 and FIG. 2, respectively of the inside and the outside of the aircraft (with the flap being cut out in FIG. 2 for better visibility), combines the vent flap which is arranged in the door 10 and an inner handle 1 which is articulated on a main shaft 102: the flap 110 is to prevent the pressurization (in the event of incorrect closure of the door), manipulation of the handle 1, limitation of opening of the door in standard pressurized conditions, and opening of the door in conditions which are disrupted, in particular by ice or frost.

This mechanism 100 is also used to prevent the door from opening from the inside of the cabin in pressurization conditions which are higher than the standard. Even in the case of external pressure—for example during rapid descent of the aircraft or when there are negative aerodynamic forces tending to exert pressure on the outer face of the flap, which face is situated on the outside of the aircraft—the conditional opening mechanism 100 is neither unlocked nor unblocked thanks to the blocking/locking mechanism described below.

The conditional opening mechanism 100 illustrated in FIG. 1 consists of the vent flap 110, coupled to the main shaft 102 of the handle 1 by eccentric connecting rods 103, which are fitted in opposition to return springs 32, and the mechanism consists of a pivot connection 12 (cf. FIG. 3) composed of a blocking shaft 120 which is integral with the flap 110, and on which pressure levers 121 are fitted. Each pressure lever 121 comprises at its two ends a blocking roller 122 and an unblocking roller 123.

If the blocking latches of the blocking/locking mechanism are not in position in order to block the locks (see hereinafter the description of the blocking/locking mechanism with reference to FIGS. 8a and 8b), the vent flap 110 cannot close, and the aircraft cabin can therefore not be pressurized.

In the event of an attempt to open the door under a condition of pressure in the cabin which is higher than a given threshold, for example 2 psi, the opening mechanism 100 exerts a function of blocking/unblocking by the pressure levers 121 and the door does not open. In the event of negative pressure variation—the cabin pressure then being lower than the pressure outside the aircraft—the blocking rollers 122 of the pressure levers 121 abut and prevent the opening of the vent flap 110.

In the event of preliminary opening of the door for deicing or breakage of ice deposited on the door, the lower edge 111 (cf. FIG. 2) of the vent flap 110 is thrust towards the inside of the cabin by the eccentric shafts 103. Advantageously, this opening mechanism 100 prevents any mechanical interference.

In order to open the flap 110 from the outside of the aircraft "E", pressing an outer opening button 130 provided on the outer face 112 of the flap 110 actuates an opening cam 131 (cf. FIG. 2) in order to disengage the pressure levers 121 (cf. FIG. 1). Thus, the opening mechanism 100 is unblocked by the outer button 130—which is not sensitive to the pressure conditions—thanks to the induced "delayed" movement between the outer button 130 and the inner handle 1. This delayed movement is also used for opening in conditions of interference, for example in order to break the ice.

Figure 3:
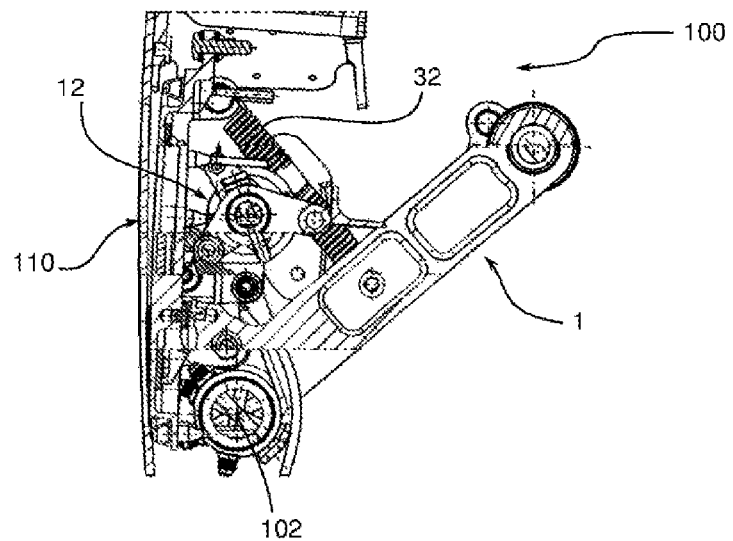
FIG. 3 is a lateral view in cross-section of the conditional opening mechanism illustrating the movement of opening of the door flap.

The delayed movement is illustrated more particularly in the view in lateral cross-section of the opening mechanism 100 in FIG. 3. With the inner handle 1 being directly fitted on the main shaft 102, the vent flap 110 is connected to the handle 1 via the pivot connection 12, and the two return springs 32 which tend to maintain the contact. In nominal conditions (i.e. without pressure on the flap 110 and without ice on the outside of the door), the flap 110 and the handle 1 are displaced jointly, with the contact being ensured by the springs 32. A delay of movement between the handle 1 and the flap 110 takes place if a force greater than the return force of the springs 32 is applied to the flap.

Figure 4:
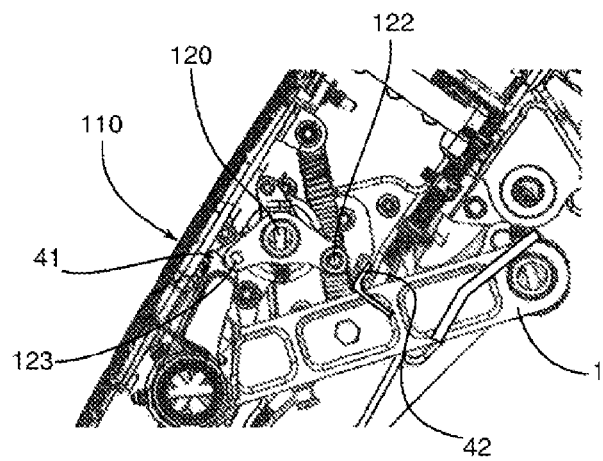
FIG. 4 is a more detailed lateral view than FIG. 3, relating to the unblocking of the conditional opening mechanism.

The more detailed lateral view in FIG. 4 relates to the unblocking of the conditional opening mechanism 100 at each end by an unblocking cam 41 which disengages the unblocking roller 123 from the flap 110.

Figure 5A:
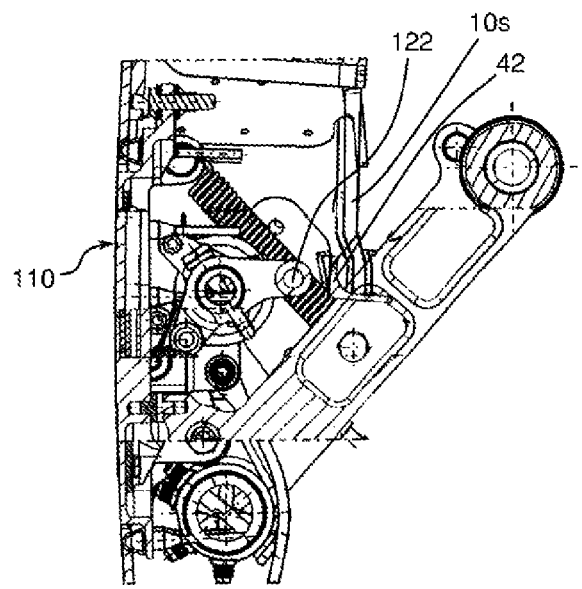
FIG. 5a is a lateral view in cross-section of the opening mechanism, relating to essential sequences of opening of the vent flap in normal pressure conditions showing a first position.
Figure 5B:
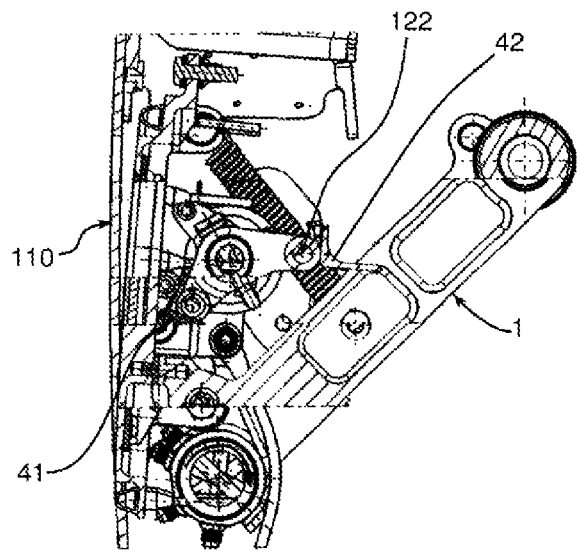
FIG. 5b is a lateral view in cross-section of the opening mechanism, relating to essential sequences of opening of the vent flap in normal pressure conditions showing a second position.
Figure 5C:
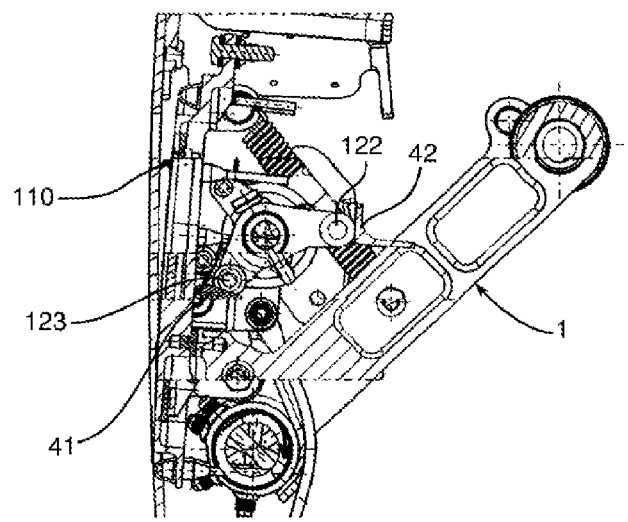
FIG. 5c is a lateral view in cross-section of the opening mechanism, relating to essential sequences of opening of the vent flap in normal pressure conditions showing a third position.
Figure 5D:
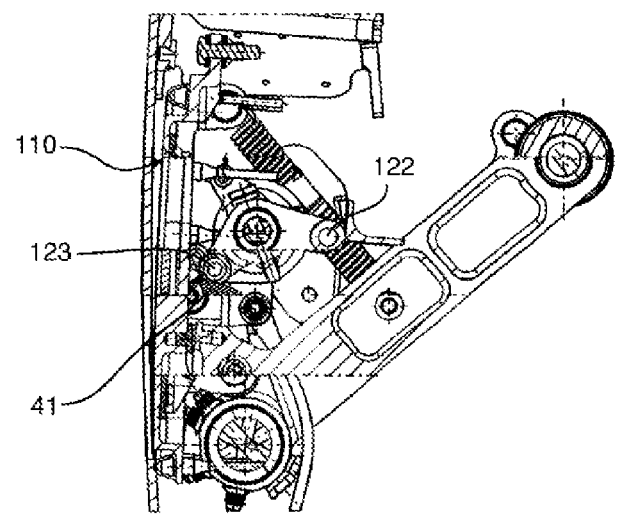
FIG. 5d is a lateral view in cross-section of the opening mechanism, relating to essential sequences of opening of the vent flap in normal pressure conditions showing a fourth position.
Figure 5E:
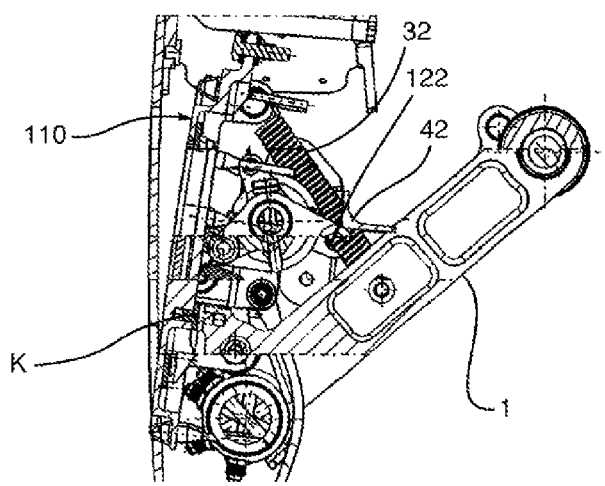
FIG. 5e is a lateral view in cross-section of the opening mechanism, relating to essential sequences of opening of the vent flap in normal pressure conditions showing a fifth position.

The unblocking cam 41 which is secured on the blocking shaft 120 is displaced together with the handle 1. In nominal conditions, when the door is opened from the inside, each blocking roller 122 initially comes into contact with a stop 42 secured on a lateral door mounting 10s (cf. FIG. 5a). In a second stage, the unblocking cam 41 thrusts the unblocking roller 123, and forces the rotation of the blocking shaft 120. The blocking roller 122 is detached from the stop and the vent flap 110 is released in order to continue its opening. In other words, the contact of the blocking rollers 123 on the stops 42 allows the unblocking rollers 122 to roll below the cams 41 and to be disengaged from them, which releases the opening of the flap 110.

In conditions of excess pressure, with variation of more than 2 psi in the example, the flap 110 cannot open: the blocking shaft 120 turns when the inner handle 1 is raised, the unblocking rollers 123 roll below the cam 41, and the flap 110 remains blocked. In fact, before the unblocking rollers 123 are disengaged from the cams, the first blocking rollers 122 come into contact with the stops 42 and block the mechanism 100: the flap 110 can not open.

Figure 5F:
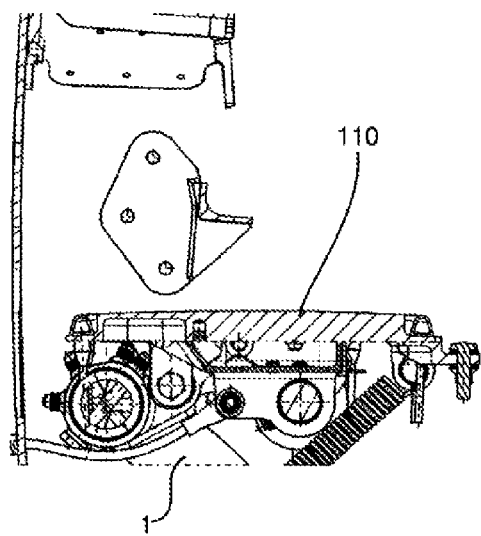
FIG. 5f is a lateral view in cross-section of the opening mechanism, relating to essential sequences of opening of the vent flap in normal pressure conditions showing a sixth position.

The lateral views in cross-section of the opening mechanism 100 in FIGS. 5a to 5f relates to the essential opening sequences of the vent flap 110 in normal pressure conditions (i.e. residual conditions) by lowering of the handle 1: the vent flap 110 is firstly in the closed position with the blocking roller 122 spaced from the stop 42 (FIG. 5a); then, the roller 123 for unblocking of the vent flap 110 comes into contact with the cam 41 (FIG. 5b); the blocking roller 122 then comes into contact with the stop 42, giving rise to a loss of contact between the handle 1 and the flap 110 (FIG. 5c); the unblocking of the vent flap 110 is then implemented by the advance of the unblocking roller 123 on the unblocking cam 41 (FIG. 5d), followed by rotation of the vent flap 110 by retraction of the springs 32 after the blocking roller 122 has been extracted from the stop 42, and contact "K" between the handle 1 and the flap 110 (FIG. 5e); the released vent flap 110 ends up in the fully open position when the inner handle 1 is completely lowered (FIG. 5f).

Figure 6A:
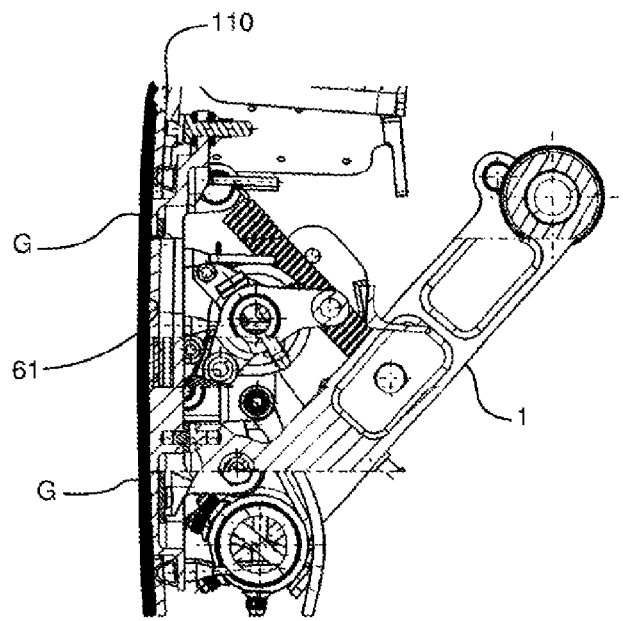
FIG. 6a shows a lateral view in cross-section of the opening mechanism, illustrating a sequence of opening of the vent flap when the outer face of the door structure is covered with a layer of ice in a first position.
Figure 6B:
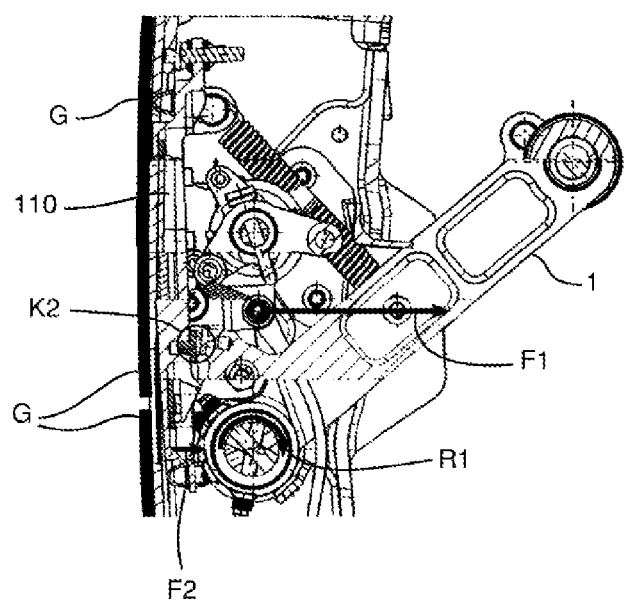
FIG. 6b shows a lateral view in cross-section of the opening mechanism, illustrating a sequence of opening of the vent flap when the outer face of the door structure is covered with a layer of ice in a second position.
Figure 6C:
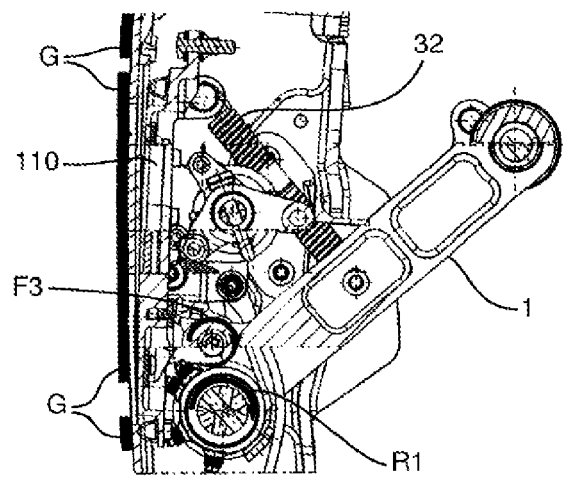
FIG. 6c shows a lateral view in cross-section of the opening mechanism, illustrating a sequence of opening of the vent flap when the outer face of the door structure is covered with a layer of ice in a third position.

The lateral views in cross-section in FIGS. 6a to 6c illustrate an opening sequence of the vent flap 110 when the outer face of the door structure 61 is covered with a layer of ice "G" which impedes the opening of said flap: the vent flap 110 is firstly in the closed position (FIG. 6a); then, the flap 110 turns relative to the handle 1 (in rotation R1) with: a loss of contact in the area K2 between the handle 1 and the flap 110, displacement of the flap (arrow F1) and induced traction of the flap 110 (arrow F2) (FIG. 6b). The ice "G" is then broken on the periphery of the flap 110, with the breakage of ice beginning at the bottom of the flap 110 thanks to the induced traction (arrow F2), and propagating to the remainder of the flap 110 in order to release it completely. The springs 32 then return the flap 110 which turns (arrow F3) in order to come back into contact with the handle 1 (FIG. 6c).

Figure 7A:
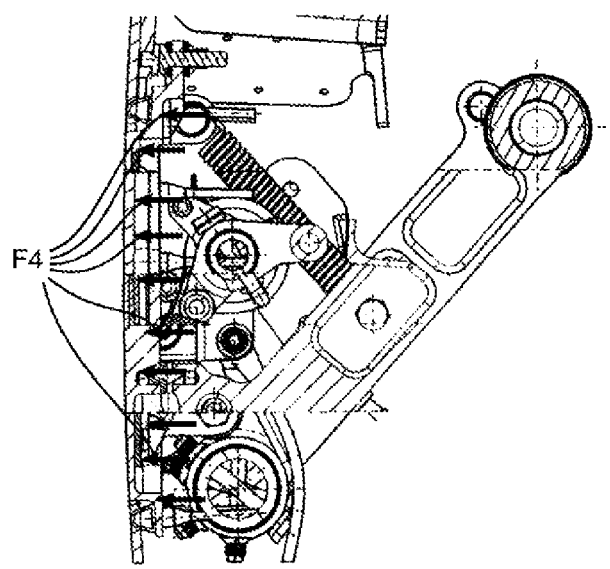
FIG. 7a shows a lateral view in cross-section of the opening mechanism illustrating a sequence of blocking the opening of the vent flap in a first position.
Figure 7B:
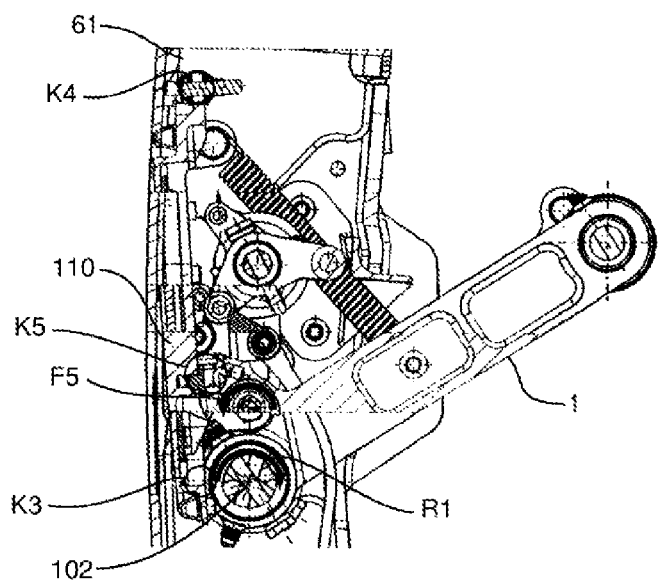
FIG. 7b shows a lateral view in cross-section of the opening mechanism illustrating a sequence of blocking the opening of the vent flap in a second position.
Figure 7C:
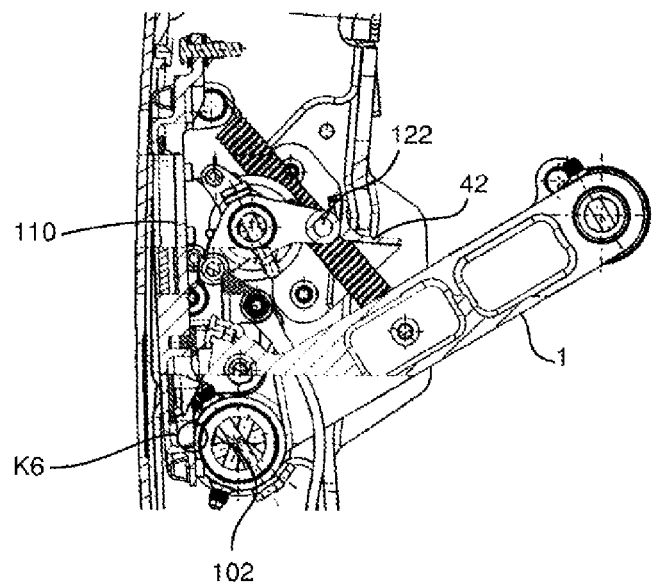
FIG. 7c shows a lateral view in cross-section of the opening mechanism illustrating a sequence of blocking the opening of the vent flap in a third position.

A sequence of blocking the opening of the vent flap 110 is illustrated by the lateral views in FIGS. 7a to 7c in the case of excess pressure, 2 psi in the example, of the cabin relative to the outside of the aircraft: the vent flap is closed with excess pressure of the cabin symbolized by the arrows F4 (FIG. 7a); then (FIG. 7b), the vent flap 110 is rotated (arrow F5) until it comes into contact in the area K3 with the rotation shaft 102 of the handle 1, the rotation of which is actuated (arrow R1). The vent flap 110 is maintained by the excess pressure (arrows F4) in contact with the door structure 61 in the area K4 of the upper edge of the flap 110, whereas a loss of contact K5 occurs between the handle 1 and the flap 110, with contact between the shaft 102 for rotation of the handle 1 and the vent flap 110 (FIG. 7b). The blocking roller 122 is supported on the stop 42, and contact is established in the area K6 between the shaft 102 of the handle 1 and the vent flap 110 (FIG. 7c).

Figure 8A:
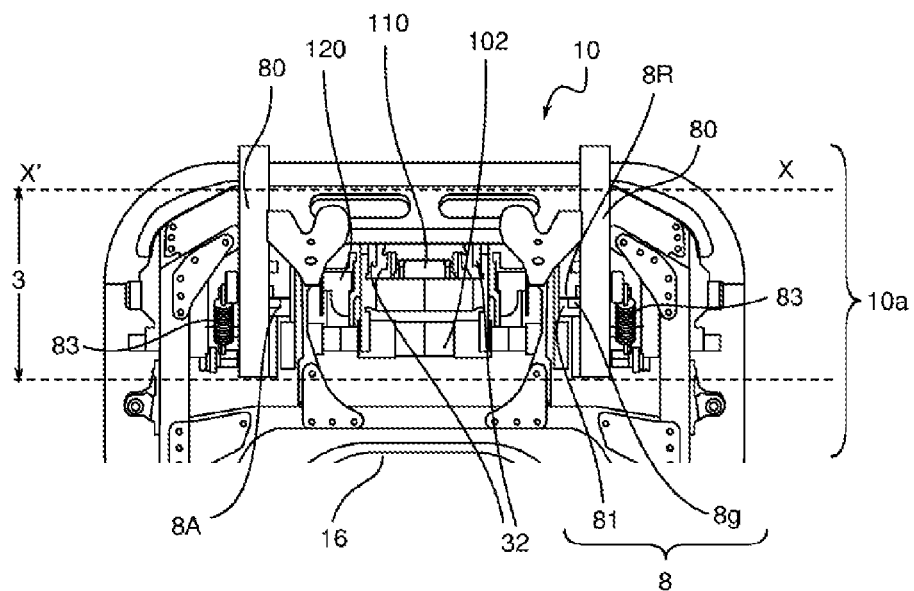
FIG. 8a shows a front view of the door strip incorporating the opening mechanisms, and in particular the blocking/locking mechanism.

More specifically, the functional conditional opening mechanisms described above, and the functions of opening the door itself and of locking/unlocking described below, are grouped into an emergency exit door strip 3 according to the invention, an example of which is illustrated in FIG. 8a. This FIG. 8a shows an aircraft emergency exit door panel according to the invention in partial front view from the inside of the cabin. Only the upper part 10a which is situated above the window 16 of the door 10 is shown in this figure. An example of a door strip 3 extends in the reduced space of this upper part 10a.

The door opening mechanism comprises two hinges 80, which conventionally have the function of permitting the pivoting around an axis X'X in the door framework, and retention of the door 10 as far as its open position. It also comprises a so-called blocking/locking connection mechanism 8 between each hinge 80 and a lock 81 which comprises duplicated means on both sides of the strip 3 on locking shafts 8A, in particular a lock 81 provided with a roller 8g circulating on a guide ramp 8R. The objective of these connections is to keep the door locked, in particular at aircraft azimuth in flight, irrespective of the constraints, i.e. uncommon fault of the mechanism, mechanical interference in the environment, loads which tend to unlock, etc.

Figure 8B:
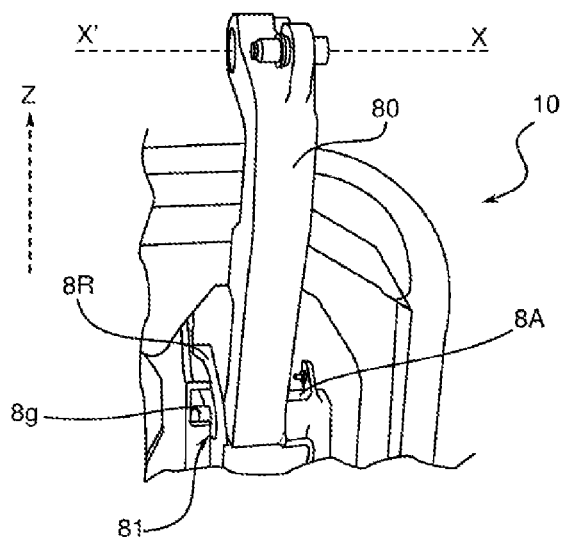
FIG. 8b shows an enlarged view of the door strip incorporating the opening mechanisms, and in particular the blocking/locking mechanism.

As shown in the enlargement in FIG. 8b, the locking shaft 8A is fitted in the lower part of each hinge 80, and each lock 81, provided with the roller 8g driven on the guide ramp 8R, is fitted on the locking shaft 8A, such that the lock 81 is directly connected to the corresponding hinge 80. Displacement of the door at azimuth, "aircraft Z", brings the lock 81 into contact with the lock guide ramp 8R, and tends not to unlock the mechanism (i.e. the "overlock" mechanism). The locks 81 which are fitted on the hinges 80 also prevent the door from moving at aircraft Z.

Figure 9A:
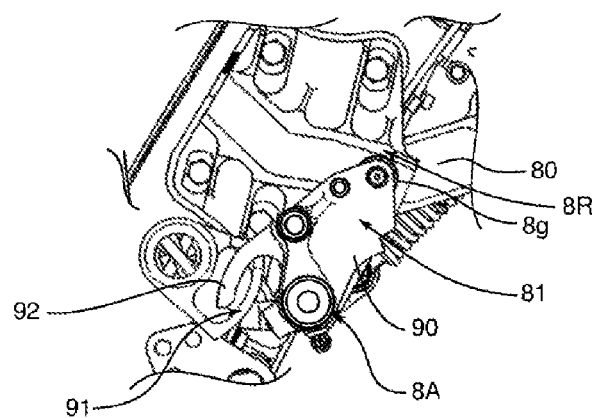
FIG. 9a shows a cross-section view of the blocking/locking mechanism.

The door opening mechanism can be actuated only when the locking/unlocking mechanism permits it. This locking/unlocking mechanism 8 is illustrated more specifically by the view in lateral cross-section in FIG. 9a. For each hinge 80, this mechanism comprises a blocking latch 91 and counter-latch 92 system combined with the lock 81 on its guide ramp 8R.

Figure 9B:
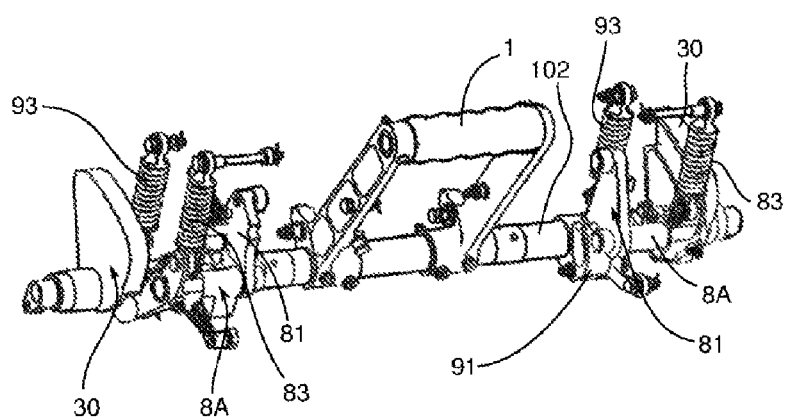
FIG. 9b shows a perspective view of the blocking/locking mechanism.
Figure 10A:
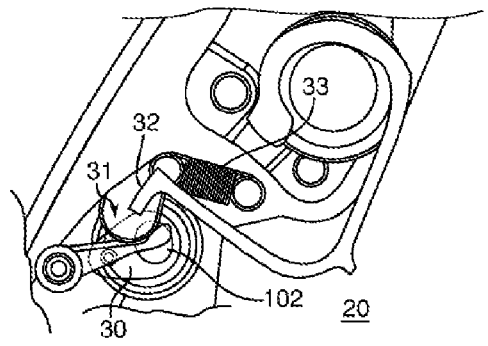
FIG. 10a is a lateral view in cross-section of the breakage mechanism, illustrating a first successive instants of the to-and-fro displacement sequence of the door.
Figure 10B:
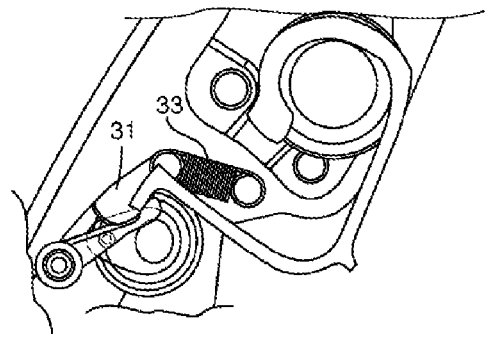
FIG. 10b is a lateral view in cross-section of the breakage mechanism, illustrating a second successive instants of the to-and-fro displacement sequence of the door.
Figure 10C:
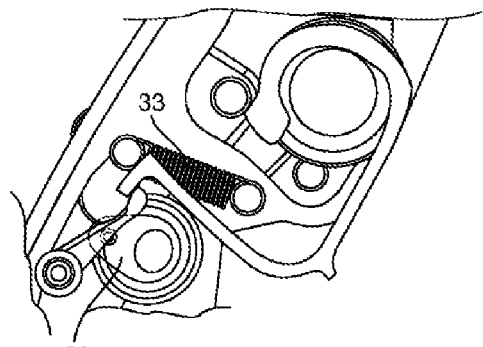
FIG. 10c is a lateral view in cross-section of the breakage mechanism, illustrating a third successive instants of the to-and-fro displacement sequence of the door.
Figure 10D:
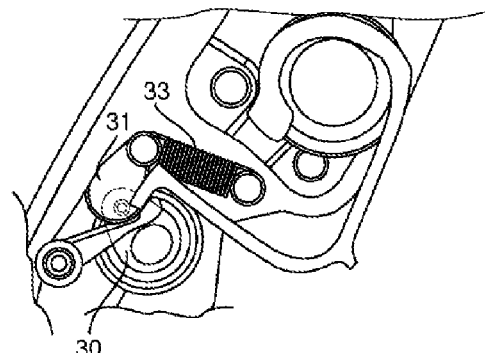
FIG. 10d is a lateral view in cross-section of the breakage mechanism, illustrating a fourth successive instants of the to-and-fro displacement sequence of the door.
Figure 10E:
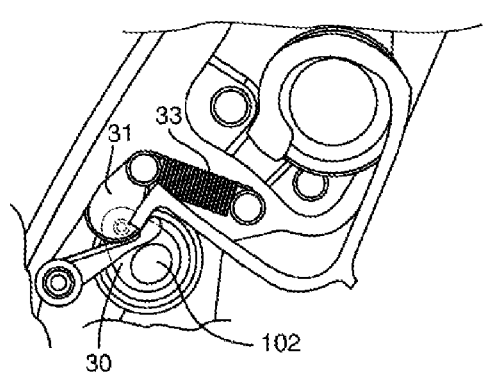
FIG. 10e is a lateral view in cross-section of the breakage mechanism, illustrating a fifth successive instants of the to-and-fro displacement sequence of the door.
Figure 10F:
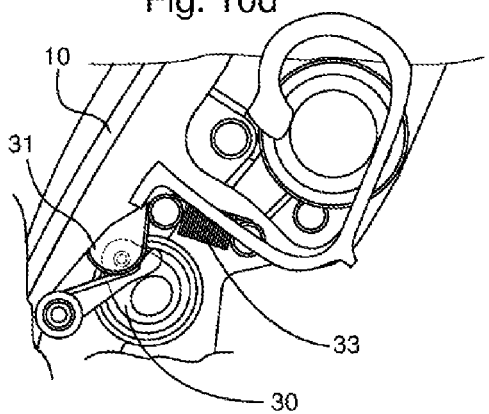
FIG. 10f is a lateral view in cross-section of the breakage mechanism, illustrating a sixth successive instants of the to-and-fro displacement sequence of the door.

The view in perspective in FIG. 9b shows more globally the door opening and locking/unlocking mechanisms fitted on the main shaft 102 for rotation of the handle 1, as well as breakage cams 30 which are positioned at the ends of the shafts 102, and are designed for the preliminary opening phase for the breakage of ice. The function of the lock 81 is to keep the door closed irrespective of the flight conditions (acceleration, turbulence, low pressure, etc.). The function of the blocking latch 91 is to keep the door secure by locking if a fault occurs in the locking/unlocking mechanism. Thus, the function of the counter-latch 92 is to keep the lock 81 in place by retaining the latch 91 and creating a positive moment which tends to overblock the system, and thus to prevent inverse entrainment of the mechanism.

Advantageously, the counter-latch 92 and the lock 81 form a single part 90, whilst each performing the same functions as when the counter-latch and the lock are separate, as in the prior architectures. The latch 91 and the counter-latch 92 have a circular form. The counter-latch 92 comes into the latch 91 in order to provide a stop inside its inner face when breakage of the locking mechanism takes place. If the stop is applied, the latch tends to overblock. Connecting rods with compression springs for locking 83 and blocking 93 are present in order to make the locks 81 and latches 91 respectively secure by exerting a return force.

In order to visualize well the preliminary step of opening of the door by the breakage mechanism, the lateral views in cross-section in FIGS. 10a to 10f show six successive instants of the to-and-fro preliminary displacement sequence of the door 10 towards the inside of the cabin 20 with minimum amplitude. This step is implemented by initiation of rotation of the breakage cams 30 fitted on the main shaft 102, each being guided on a breakage lever 31 which acts as a pivoting ramp. Each breakage lever 31 is fitted at an end 32 of a return spring 33. The cams 30, the levers 31 and the springs 32 form an ice breakage mechanism in the case where ice or frost has been deposited on the aircraft fuselage at the outer structure of the door 61 (cf. FIGS. 6a to 6c). The door 10 is displaced firstly towards the inside of the cabin from its initial closed position, which gives rise to breakage of the ice.

This preliminary step thus makes it possible to carry out breaking of ice, typically a thickness of ice of 2.5 mm on the outer structure of the door 61. This step is carried out after the step of opening the vent flap 110, just after the unblocking of the hinges 81.

Advantageously, the present architecture is independent from the sequences of unlocking of the latch-lock, and is initiated directly by actuating the shaft of the locks from the inner handle 1, contrary to the prior architectures in which the door movements in order to break the ice are determined by the movements and the kinematics of the locks.

At the end of the sequence (cf. FIG. 10f), after unblocking/unlocking by the mechanism of systems of latches 91/counter-latches 92/locks 81 (cf. FIG. 9a), and the release of the breakage cams 30 of the associated breakage levers 31, the movement of descent of the door begins.

Figure 11:
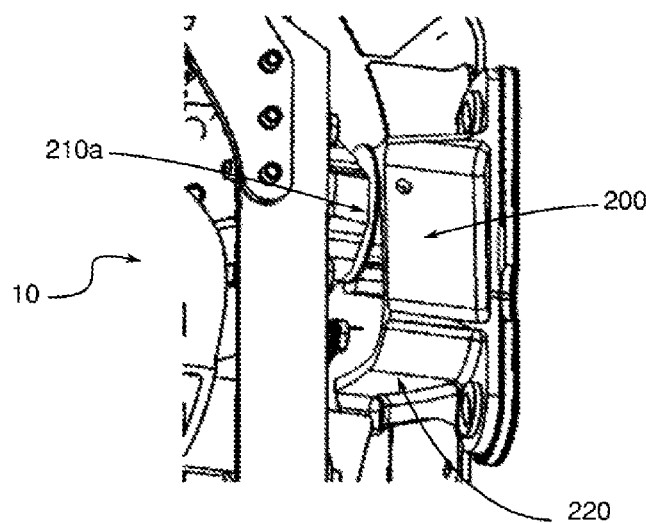
FIG. 11 is a lateral view of the fuselage framework guides 200 of the upper rollers of the door and the fuselage framework stops.

FIG. 11 illustrates the fuselage framework guides 200 for upper rollers 210a of the door 10 during the descent of the door, and the bypassing of the stops 220 of the fuselage framework. The rollers 210a coming from the lateral faces of the door 10 circulate in the guide ramps 200 formed in the framework of the fuselage, and the door 10 reaches the low position by bypassing the lower stops of the fuselage 220.

Figures 12A, 12B:
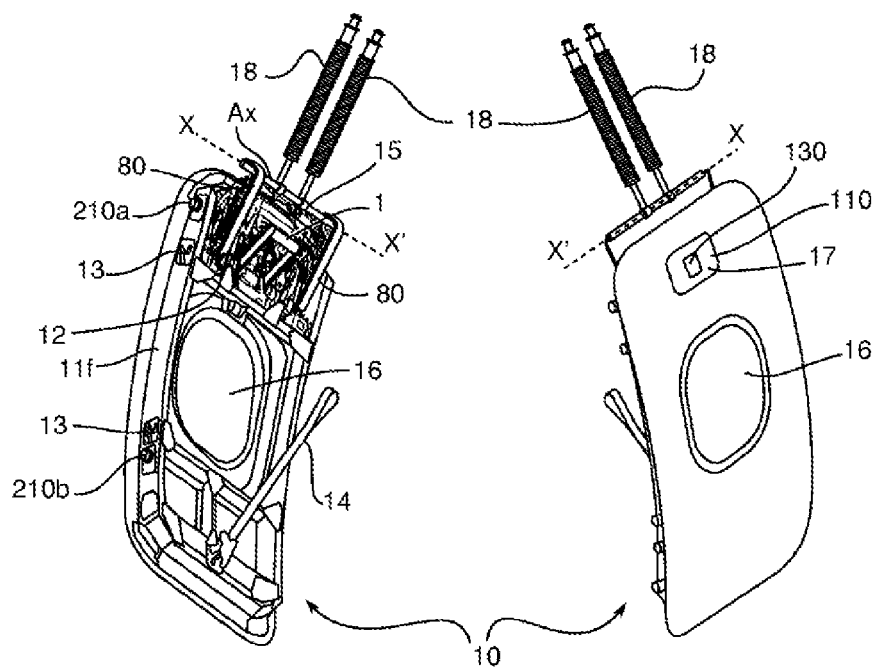
FIG. 12a shows an internal view in perspective of an emergency exit door according to the invention.
FIG. 12b shows an external view in perspective of an emergency exit door according to the invention.

FIGS. 12a and 12b illustrate a global presentation of the emergency exit door 10, respectively in inner and outer perspective views. The door 10 in the low position is positioned in order to pivot by means of rotary entrainment around the axis X'X for rotation of the hinges 80. Two actuators 18, fitted laterally on the same shaft Ax as the hinges 80, facilitate this rotation. These figures also show the upper door guide rollers 210a, the door stops 13 on the lateral flanks 11f, a locking/blocking detector 12, a strap 14 for manual gripping, advantageously a safety in-flight door blocking system known as a flight lock 15 (for cases of low safety between 0 psi and the pressure used for the calibration of the springs, which is approximately 1 psi in the example), the window 16 (with the same dimensions as the other passenger windows of the aircraft fuselage), and the vent flap 110 forming an outer handle 17 with the button 130 for opening the door from the outside.

The invention is not limited to the embodiments described and represented.

The invention relates to a multifunctional combination of opening mechanisms integrated by means of a connection with the flap 110. This connection can either be direct, if the flap is placed below the inner handle 1, as illustrated for example by FIG. 1 or 2, or adapted to an offset position of the flap 110 because of the dimensions of this flap (according to the pressurization values) and space available.

Figures 13A, 13B:
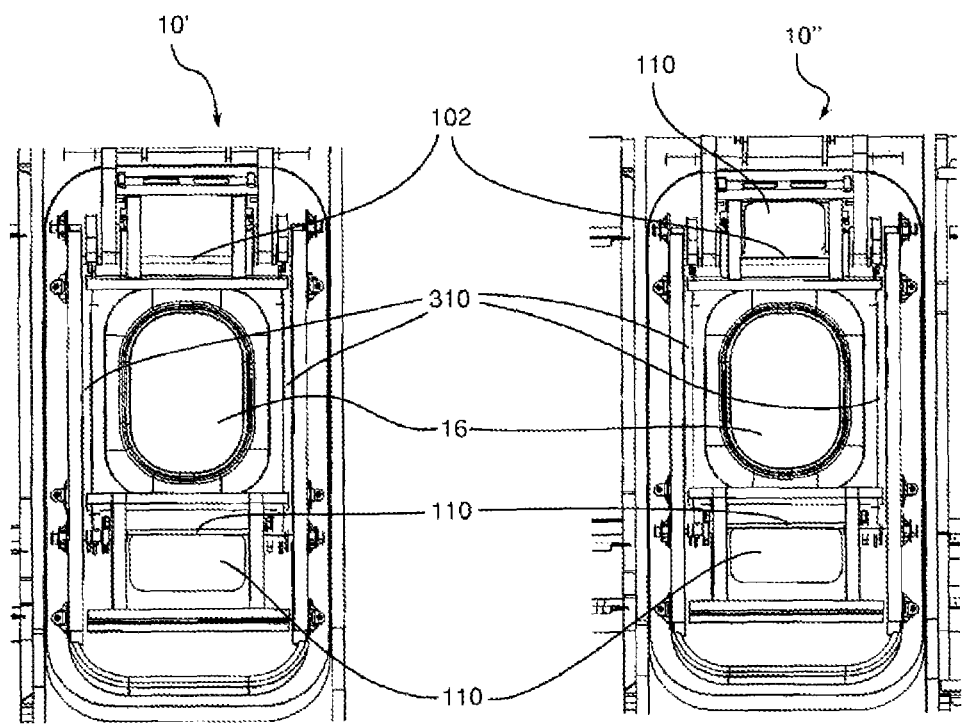
FIG. 13a shows a front view of an emergency exit door with, a vent flap offset below the window.
FIG. 13b shows a front view of an emergency exit door two vent flaps, one being arranged above and the other offset below the window.

A flap 110 of this type, offset below the window 16, is illustrated by the front view of the emergency exit door 10' in FIG. 13a from the inside of the cabin. In order to actuate the opening of the flap 110, coupling connecting rods 310 connect the main shaft 102 and the blocking shaft 120 of the flap 110. As a variant, with reference to the front view of the door 10" in FIG. 13b, two flaps 110 can be used in the two locations described above with reference to FIG. 1 or 2, i.e. above and below the window 16.

The invention claimed is:

1. An aircraft emergency exit door with opening mechanisms which are integrated by grouping, wherein the grouping of door opening mechanisms is carried out in a grouping strip situated on a side of a window with standard dimensions, in the strip, the grouping comprises a door opening inner handle fitted on a main shaft in association with a locking shaft on which there is fitted a mechanism for blocking/locking the door with latches and locks;
   wherein at least one mechanism for conditional opening of the door comprises a vent flap arranged in the door, a pivot connection arranged in the door in order to couple the flap to the inner handle, and a blocking shaft which has at each end a pressure lever equipped with a first and second support for blocking and unblocking of the flap; and
   wherein return springs which are fitted against the conditional opening mechanism are calibrated in order to allow opening of said flap by exerting a reduced pressure in residual pressure variation conditions between the inside and outside of the aircraft, and in order to prevent the flap from opening in excess pressure conditions.

2. The emergency exit door as claimed in claim 1, wherein the first and second blocking and unblocking supports can come into contact respectively on a stop and on a cam which are secured respectively on the blocking shaft and on a door mounting, wherein, in residual pressure variation conditions, the pressure levers and the flap can be displaced jointly by actuation of the inner handle, and allow the flap to open, and wherein, in excess pressure conditions, the flap remains on the door, and the first supports then come into contact with the stops in order to block the flap.

3. The emergency exit door as claimed in claim 1, wherein an exit opening button is provided on an outer face of the vent flap, in order to actuate an opening cam, disengage the pressure levers and thus permit opening of the door from the outside of the aircraft.

4. The emergency exit door as claimed in claim 1, wherein the blocking/locking mechanism comprises a blocking latch for each lock, which lock is fitted against a hinge for pivoting and retention of the door in the open position, the fitting blocks any displacement of the door at relative azimuth of the aircraft.

5. The emergency exit door as claimed in claim 1, wherein the blocking/locking mechanism is formed by a latch and counter-latch blocking assembly combined with each lock, with the counter-latch and the lock of each assembly, which are fitted on the same locking shaft, forming a single part.

6. The emergency exit door as claimed in either of claim 4, wherein the latch enveloped the lock and retain the lock in place when the locking mechanism breaks, in order to keep the door in a secure state.

7. The emergency exit door as claimed in claim 5, wherein the counter-latch is configured to form a protuberance inside the latch to create a stop when breakage of the locking mechanism takes place.

8. The emergency exit door as claimed in claim 1, wherein an ice breakage mechanism is also integrated in the mechanism grouping strip, the ice breakage mechanism comprising at each end of the strip a cam which is fitted on the main shaft, each cam being guided by a pivoting ramp connected to a return spring, in order, by the actuation of the locking shaft by the inner handle, to generate a door opening sequence with a minimal amplitude towards the inside of the passenger cabin, and to break a specific thickness of ice.

9. The emergency exit door as claimed in claim 1, wherein the door opening mechanism grouping strip extends horizontally above the window, with the door being able to opened by pivoting according to a horizontal axis which coincides with an upper edge of the emergency door, and the flap is positioned at the strip, and/or is offset below the window, connected to coupling connecting rods which connect the main shaft and the shaft for blocking of the flap.

10. A method for opening/closure of an aircraft emergency exit door, the door being situated over the aircraft wing, in order to permit evacuation of the passenger cabin, with the closure kinematics of the door repeating the above opening steps in inverse order, the method comprises the steps of:
   implementing opening kinematics for a door which is arranged in a framework of the aircraft fuselage;
   starting from an initial state in which the door is in the closed position with a profile aligned with the fuselage, according to the following series of steps generated in succession by a single action exerted on an inner handle in a single pivoting sequence around a main shaft:

opening of a vent flap of the conditional opening mechanism, when a pressure variation between the cabin and the outside of the aircraft is lower than a specific residual value;

unblocking/unlocking by actuation of a movement of the latches in order to unblock the locks and retract these unblocked locks so as to finalize the unlocking by releasing the main shaft;

opening of the door by rotation of the main shaft, giving rise to a movement of tilting of the door towards the inside of the cabin;

translation substantially parallel to the fuselage, in association with guiding in the door framework and bypassing of the fuselage stops; and pivoting of the door entrained around an axis of rotation of the hinges, and assisted in this rotation by actuators which are arranged laterally.

11. The opening method as claimed in claim 10, wherein a condition of excess pressure between the inside and the outside of the aircraft, higher than a given threshold value, blocks the conditional opening mechanism during the implementation, in order to prevent the opening of the vent flap during the first step.

12. The opening method as claimed in either of claims 10, wherein a preliminary step of opening of the door towards the inside of the cabin with minimal amplitude is generated by initiation of rotation of breakage cams which are fitted on the main shaft, in association with a guide ramp coupled to a return spring, the step being carried out after the step of opening of the vent flap and before the step of unblocking/unlocking.

13. The opening method as claimed in claim 11, wherein the initiation of preliminary rotation, which is designed to break ice, is carried out by a to-and-fro rotation/counter-rotation according to an appropriate configuration of the breakage cams.

* * * * *